M. Delaney. Mould for Vulcanizing Billiard Cushions.

116819  PATENTED JUL 11 1871

Witnesses:
John Becker
Gustave Dieterich

Inventor:
M. Delaney
Per [Attorneys signature]
Attorneys.

UNITED STATES PATENT OFFICE.

MATHEW DELANEY, OF NEW YORK, N. Y.

IMPROVEMENT IN MANUFACTURE OF RUBBER CUSHIONS FOR BILLIARD-TABLES.

Specification forming part of Letters Patent No. 116,819, dated July 11, 1871.

*To all whom it may concern:*

Be it known that I, MATHEW DELANEY, of the city, county, and State of New York, have invented a new and Improved Mold for and Method of Vulcanizing Perforated Billiard-Cushions; and I do hereby declare that the following is a full, clear, and exact description thereof, which will enable others skilled in the art to make and use the same, reference being had to the accompanying drawing forming part of this specification.

Figure 1:
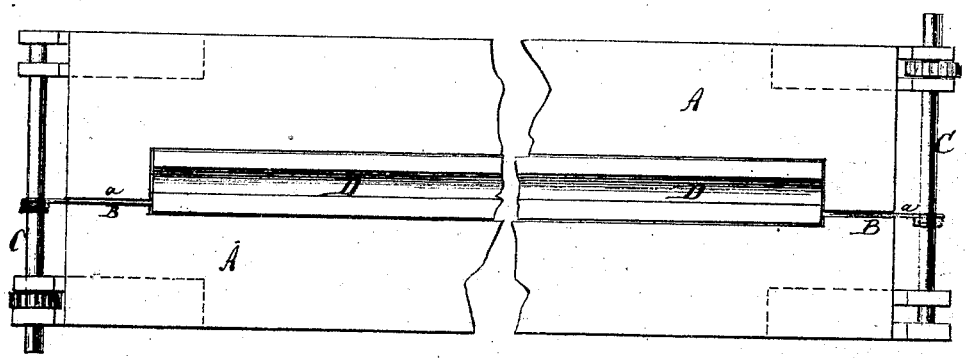
Figure 2:
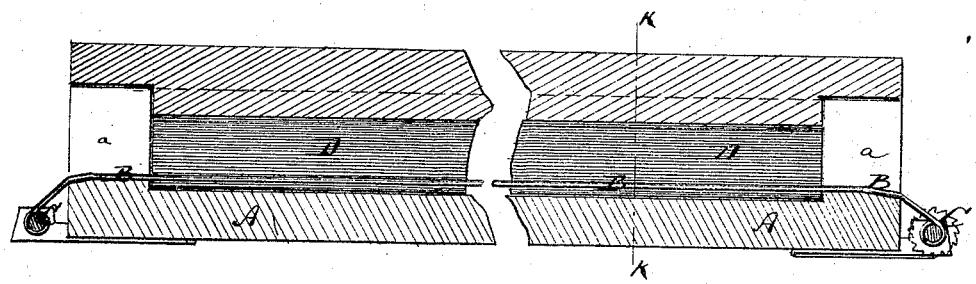
Figure 3:
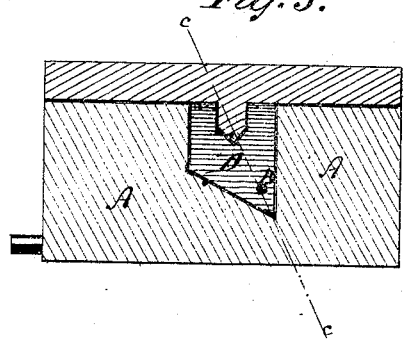

Figure 1 represents a plan or top view of my improved vulcanizing-mold. Fig. 2 is a longitudinal section of the same on the line c c, Fig. 3. Fig. 3 is a vertical transverse section of the same on the line k k, Fig. 2.

Similar letters of reference indicate corresponding parts.

This invention has for its object so to construct a flask or mold for vulcanizing long billiard-cushions that the apertures through the latter for the reception of the bracing and strengthening-wires will be straight and smooth. The invention consists in combining, with the said flask or mold, a wire, which is drawn through the non-vulcanized rubber, and then stretched and straightened to properly form the desired aperture.

A in the drawing represents the mold or flask of suitable form and size. Its ends are slotted or perforated, as at a a, to receive the wire or string B, which is drawn through the entire length of mold, and fastened with its ends to windlasses or horizontal shafts C that hang in bearings at the end of the mold, as shown. Before the rubber billiard-cushion D to be vulcanized is placed within the mold the wire B is put through it and then secured to the shafts C, and stretched to be quite straight in the rubber. The mold is next closed, and the vulcanizing process carried on. When the rubber is finally removed it will be found to contain an aperture quite straight and smooth.

Heretofore it has been found quite difficult to provide long cushions for billiards with straight small holes, and only by the application of the stretched wire has the difficulty been overcome.

Having thus described my invention, I claim as new and desire to secure by Letters Patent—

1. The vulcanizing-mold, provided with the slotted or perforated ends, and with the wire or string which can be stretched on the shafts C, as set forth.

2. The herein-described method of forming straight smooth apertures through rubber billiard-cushions by drawing a wire or string through them during the vulcanizing process, as specified.

MATHEW DELANEY.

Witnesses:
GEO. W. MABEE,
T. B. MOSHER.